(12) United States Patent
Kim et al.

(10) Patent No.: US 7,628,755 B2
(45) Date of Patent: Dec. 8, 2009

(54) APPARATUS AND METHOD FOR PROCESSING AN ULTRASOUND IMAGE

(75) Inventors: Nam Chul Kim, Daegu (KR); Sang Hyun Kim, Busan (KR); Jong In Kwak, Daegu (KR); Do Young Choi, Seoul (KR); Eui Chul Kwon, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 431 days.

(21) Appl. No.: 11/508,196

(22) Filed: Aug. 23, 2006

(65) Prior Publication Data

US 2007/0053566 A1 Mar. 8, 2007

(30) Foreign Application Priority Data

Aug. 24, 2005 (KR) ............... 10-2005-0077740

(51) Int. Cl.
*A61B 8/00* (2006.01)
(52) U.S. Cl. ............... 600/437; 600/443; 128/916; 382/173; 382/174
(58) Field of Classification Search ............... 600/437, 600/440, 441, 443, 447, 453–456, 407; 128/916; 382/173, 174
See application file for complete search history.

(56) References Cited

U.S. PATENT DOCUMENTS 5,782,766 A * 7/1998 Weng et al. ............... 600/443
2004/0006273 A1 1/2004 Kim et al.
2004/0054281 A1 * 3/2004 Adam et al. ............... 600/437
2005/0033123 A1 2/2005 Gardner et al.
2005/0049502 A1 * 3/2005 Schoisswohl ............... 600/453

FOREIGN PATENT DOCUMENTS

WO WO 2004/099814 A1 11/2004

OTHER PUBLICATIONS

Lakhwinder Kaur, et al. "Image Denoising Using Wavelet Thresholding", ICVGIP-2002, XP-002410710, Dec. 18, 2002, pp. 1-8.

* cited by examiner

*Primary Examiner*—Brian Casler
*Assistant Examiner*—Elmer Chao
(74) *Attorney, Agent, or Firm*—Oblon, Spivak, McClelland, Maier & Neustadt, P.C.

(57) ABSTRACT

The present invention relates to an apparatus for processing an ultrasound image of a target object including a periodically moving object, including: an ROI setting unit for setting regions of interest (ROIs) to each of frames constituting ultrasound volume data acquired from a target object; a VOI setting unit for selecting a predetermined number of first reference frames from the ultrasound volume data and setting a predetermined number of volumes of interest (VOIs) by combining ROIs of the first reference frames with ROIs of frames adjacent to the reference frames; a motion compensating unit for processing the VOIs to compensate a motion of the target object; a correlation coefficient curve calculating unit for calculating a correlation coefficient curve for a predetermined interval at each VOI; a period setting unit for setting a moving period of the moving object based on the correlation coefficient curve in the volume data; and an ultrasound volume data reconstructing unit for reconstructing the ultrasound volume data based on the moving period.

14 Claims, 7 Drawing Sheets

APPARATUS AND METHOD FOR PROCESSING AN ULTRASOUND IMAGE

FIELD OF THE INVENTION

The present invention generally relates to an apparatus for processing an ultrasound image, and more particularly to an apparatus and a method for processing an ultrasound image to visualize a moving object in the ultrasound image by reconstructing ultrasound volume data according to a moving period of said object.

BACKGROUND OF THE INVENTION

An ultrasound diagnostic system has become an important and popular diagnostic tool since it has a wide range of applications. Specifically, due to its non-invasive and non-destructive nature, the ultrasound diagnostic system has been extensively used in the medical profession. Modern high-performance ultrasound diagnostic systems and techniques are commonly used to produce two or three-dimensional diagnostic images of internal features of an object (e.g., human organs).

The ultrasound diagnostic system generally uses a wide bandwidth transducer to transmit and receive ultrasound signals. The ultrasound diagnostic system forms images of human internal tissues by electrically exciting an acoustic transducer element or an array of acoustic transducer elements to generate ultrasound signals that travel into the body. The ultrasound signals produce ultrasound echo signals since they are reflected from body tissues, which appear as discontinuities to the propagating ultrasound signals. Various ultrasound echo signals return to the transducer element and are converted into electrical signals, which are amplified and processed to produce ultrasound data for an image of the tissues. The ultrasound diagnostic system is very important in the medical field since it provides physicians with real-time and high-resolution images of human internal features without the need for invasive observation techniques such as surgery.

Recently, as the imaging technology in the ultrasound diagnostic system has evolved, a 3-dimensional ultrasound image can be provided. There is provided a static 3-dimensional ultrasound image as an example of the 3-dimensional ultrasound image. The static 3-dimensional image is conventionally produced by obtaining raw 3-dimensional data (e.g., data on a coordinate system (x, y, z) by using a 3-dimensional probe regardless of acquisition time) by: stacking frames upon one another at a uniform time interval to form consecutive frames; and processing the consecutive frames by using a 3-dimensional rendering technique. When the static 3-dimensional image is used for ultrasound diagnostic purposes, it is possible to perform accurate observations, diagnoses or treatments of the internal conditions of a human body without conducting complicated procedures such as invasive operations. Thus, the static 3-dimensional image is widely used. However, the static 3-dimensional image is not useful in observing a moving target object in real time such as an embryo in the uterus.

In order to overcome this shortcoming, a live 3-dimensional imaging method and apparatus for providing a 3-dimensional moving image (rather than the static 3-dimensional image) has been developed. The live 3-dimensional image consists of fewer frames than those of the real-time 3-dimensional moving image. Thus, it cannot show the complete movement of a moving target object. However, since the live 3-dimensional image consists of more frames than the static 3-dimensional image (e.g., 2 to 4 frames per second), it can show the movement of a moving target object more smoothly than the static 3-dimensional image.

Further, there has been an increased interest in the heart conditions of a fetus in order to perform an early diagnosis of the status of the fetus. However, since the systole and diastole of the heart are quickly repeated, it is impossible to scan all the movements of the heart just by using a 3-dimensional probe. Therefore, there is a problem in providing a real heartbeat image.

SUMMARY OF THE INVENTION

The present invention provides an apparatus and a method for processing a 3-dimensional ultrasound image to visualize a periodically moving object by detecting a moving period of said object and reconstructing volume data based on the moving period.

In accordance with one aspect of the present invention, there is provided an apparatus for processing an ultrasound image of a target object (including a periodically moving object), including: an ROI setting unit for setting regions of interest (ROIs) to each of the frames constituting ultrasound volume data acquired from a target object; a VOI setting unit for selecting a predetermined number of first reference frames from the ultrasound volume data and setting a predetermined number of volumes of interest (VOIs) by combining ROIs of the first reference frames with ROIs of frames adjacent to the reference frames; a motion compensating unit for processing the VOIs to compensate a motion of the target object; a correlation coefficient curve calculating unit for calculating a correlation coefficient curve for a predetermined interval at each VOI; a period setting unit for setting a moving period of the moving object based on the correlation coefficient curve in the volume data; and an ultrasound volume data reconstructing unit for reconstructing the ultrasound volume data based on the moving period.

In accordance with another aspect of the present invention, there is provided a method for processing an ultrasound image of a target object (including a periodically moving object), including: a) setting regions of interest (ROIs) to each of the frames constituting ultrasound volume data acquired from a target object; b) selecting a predetermined number of first reference frames from the ultrasound volume data and setting a predetermined number of volumes of interest (VOIs) by combining ROIs of the first reference frames with ROIs of frames adjacent to the reference frames; c) processing the VOIs to compensate a motion of the target object; d) calculating a correlation coefficient curve for a predetermined interval at each VOI; e) setting a moving period of the moving object based on the correlation coefficient curve in the volume data; and f) reconstructing the ultrasound volume data based on the moving period.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PRESENT INVENTION

Figure 1:
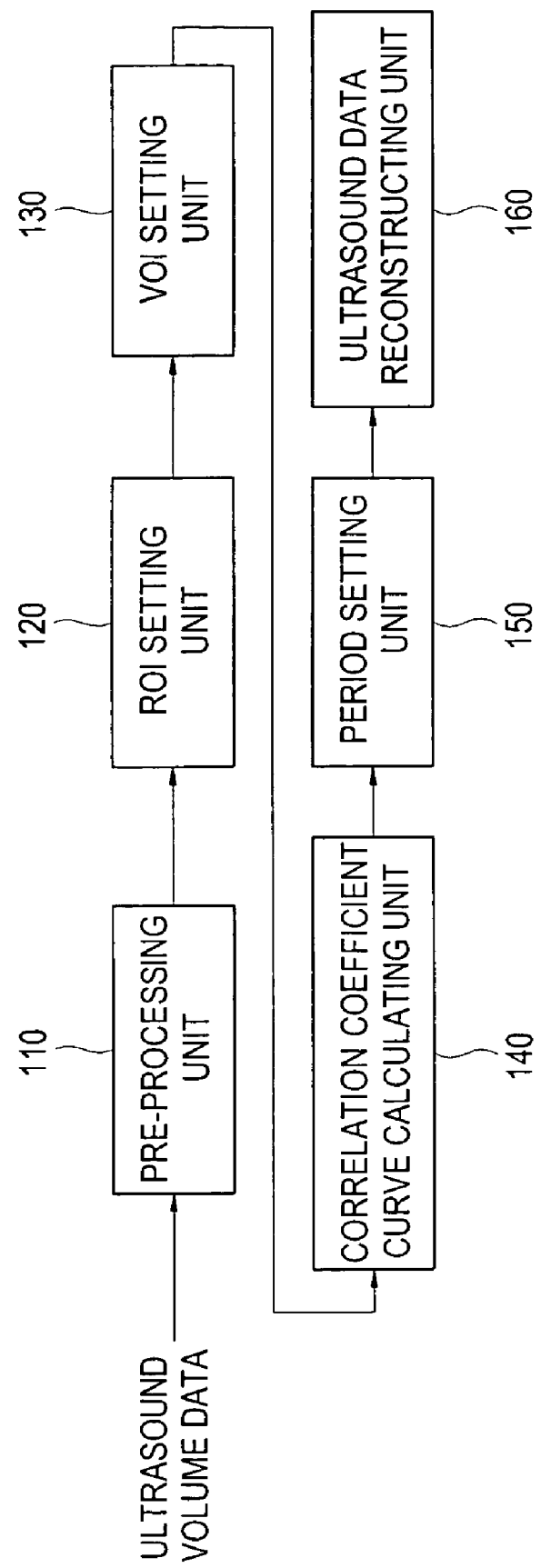
FIG. 1 is a block diagram showing an ultrasound image processing device constructed in accordance with the present invention.

FIG. 1 is a block diagram showing an ultrasound image processing device constructed in accordance with the present invention. As shown in FIG. 1, the ultrasound image processing device 100 includes a pre-processing unit 110, a region of interest (ROI) setting unit 120, a volume of interest (VOI) setting unit 130, a correlation coefficient curve calculating unit 140, a period setting unit 150 and an ultrasound data reconstructing unit 160.

Figure 2:
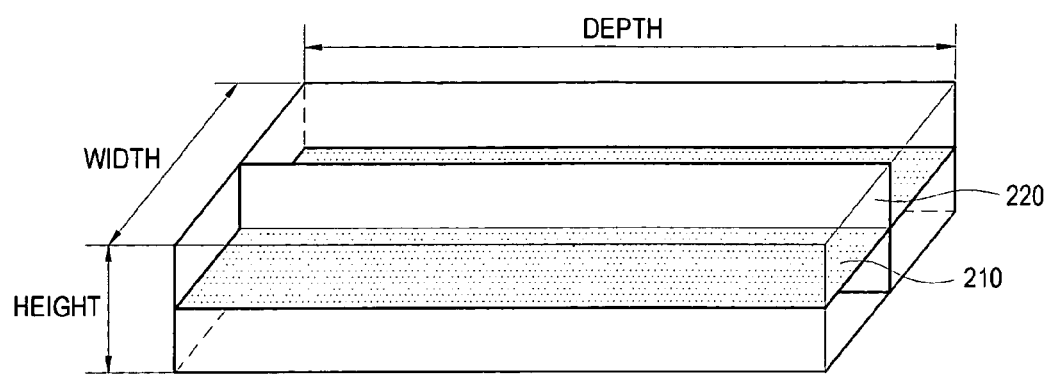
FIG. 2 is a schematic diagram showing cutting plane images in volume data.

The pre-processing unit 110 reduces or removes the noises from ultrasound volume data successively acquired from a target object through using a 3-dimensional probe (not shown). First, the pre-processing unit 110 acquires a horizontal cutting plane image 210 or a vertical cutting plane image 220 obtained by horizontally or vertically cutting the ultrasound volume data by referring to its center as shown in FIG. 2. For ease of explanation, the horizontal cutting plane image will be described as an example for processing the ultrasound image in accordance with the present invention.

The pre-processing unit 110 decomposes the horizontal cutting plane image in a wavelet domain (wavelet transform) to calculate a wavelet coefficient. If the calculated wavelet coefficient is smaller than the threshold, then the wavelet coefficient is set to zero. If the wavelet coefficient is greater than the threshold, then the wavelet coefficient is set by subtracting the threshold therefrom or the calculated wavelet coefficient is soft-thresholded so as to reset the wavelet coefficient. In this case, the soft-thresholding is not carried out for a low frequency subimage LL among subimages HH, HL, LH and LL obtained through the wavelet transform, wherein the subimage LL represents low frequency (vertical)-low frequency (horizontal) image. The soft-thresholding can be carried out by the following equation in accordance with the present invention.

$$W_j \hat{f}(t) = \text{sign}(W_j f(t))[|W_j f(t)| - Th]_+, \quad [x]_+ = \begin{cases} x, & x > 0 \\ 0, & \text{otherwise} \end{cases} \quad (1)$$

wherein, $W_j f(t)$ represents a coefficient of a high frequency at a $j^{th}$ level decomposed in the wavelet domain, sign( ) represents a sign of the coefficients, Th represents a threshold having a constant value, and $W_j \hat{f}(t)$ represents a resulting wavelet coefficient performing the soft-thresholding.

Figure 3A:
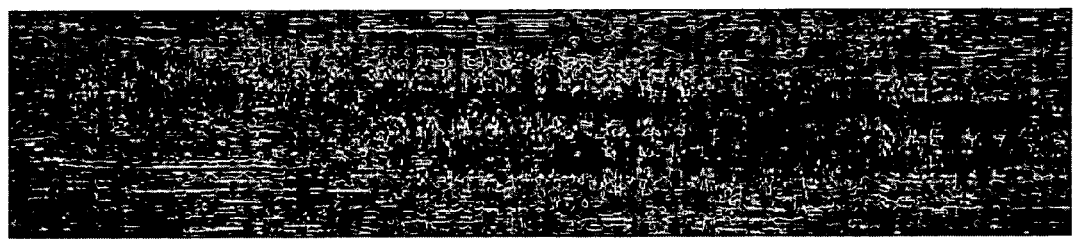
FIG. 3A is a photo showing a horizontal cutting plane image in volume data.
Figure 3B:
FIG. 3B is a photo showing an image performing soft-thresholding for a horizontal cutting plane image.

The pre-processing unit 110 reconstructs the ultrasound volume data through inverse wavelet transform after completing the soft-thresholding for the wavelet coefficient by using the equation (1). FIG. 3A shows a horizontal cutting image obtained from the ultrasound volume data, whereas FIG. 3B shows a result image of the horizontal cutting image performing the soft-thresholding in the pre-processing unit 110.

Figure 4A:
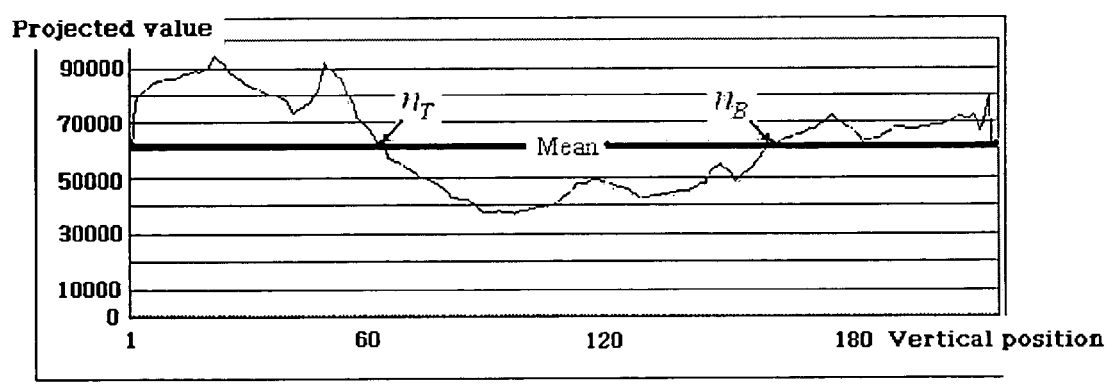
FIG. 4A is a graph showing projected values obtained through horizontal projection for a horizontal cutting plane image.

The ROI setting unit 120 performs horizontal projection for obtaining a projected value summing the brightness of all pixels along a horizontal pixel line in the pre-processed horizontal cutting plane image in the pre-processing unit 110. FIG. 4A is a graph showing the projected value obtained through the horizontal projection. Boundaries $n_T$ and $n_B$ of ROI can be calculated by using equation (2) shown below.

$$n_T = \min_n \{n | f_n < \text{Mean}\}, \quad 0 \le n < \frac{N}{2} \quad (2)$$

$$n_B = \max_n \{n | f_n < \text{Mean}\}, \quad \frac{N}{2} \le n < N$$

wherein, $f_n$ represents a horizontally projected signal, Mean represents a mean of the projected values, $n_T$ represents a vertical position of a projected value (in the most left side among the projected values smaller than a mean value), and $n_B$ represents a vertical position of a projected value (in the most-right side among the projected values smaller than a mean value). $n_T$ and $n_B$ are used as the boundaries of ROI.

Figure 4B:
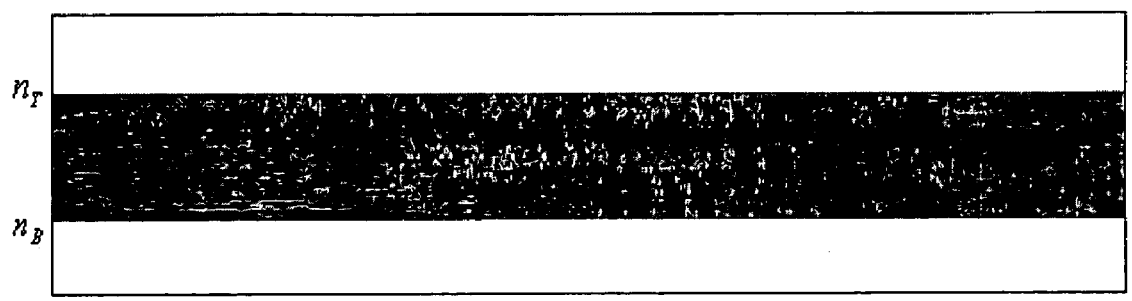
FIG. 4B is a photo showing an image masking a horizontal cutting plane image by a mask using ROI boundaries.
Figure 4C:
FIG. 4C is a photo showing ROI set in a frame.

The ROI setting unit 120 masks the horizontal cutting plane image by using the boundaries $n_T$ and $n_B$ of ROI, thereby removing regions that are located outside the boundaries $n_T$ and $n_B$. FIG. 4B is a resulting photo masking the horizontal cutting plane image by using the boundaries $n_T$ and $n_B$ obtained through the equation (2). FIG. 4C is a photo showing ROI in a frame of the ultrasound volume data.

The VOI setting unit 130 selects frames including a moving object within the target object by using the standard deviation of brightness of the vertical lines in the horizontal cutting plane image masked with the ROI boundaries. For example, the moving object may be a heart of a fetus. Since the heart includes valves (displayed in a bright portion) as well as atria and ventricles (displayed in a dark portion), the image of the heart relatively has a large contrast. Therefore, the vertical lines including a heart region can be found by using the standard deviation of the brightness of the vertical lines. Also, since the contrast rapidly changes between the vertical lines included in the heart region and neighboring vertical lines, the vertical lines can be more accurately selected by finding a vertical line having a maximum standard deviation between the neighboring vertical lines. This is so that the vertical lines, which are not included in the heart region and have a large contrast, can be excluded from the vertical lines included in the heart region.

The VOI setting unit 130 selects three vertical lines having a maximum standard deviation difference between the neighboring vertical lines in order to detect a reference frame for setting VOI. Pseudo codes of algorithm for selecting three vertical lines are as follows:

DO    i=0,1,2

Step 1. $\hat{k}_i = \underset{k_i}{\text{argmax}}(|\sigma_{k_i} - \sigma_{k_{i-1}}|)$, $(0 \le k_i < K)$ Step 2. reject the range of $[k_i-C, K_i+C]$ in the search range

END DO wherein, $\sigma_{\hat{k}_i}$, represents the standard deviation of the vertical lines existing on the horizontal cutting plane image, $k_i$ represents an order of the vertical lines (identical to that of the frames in the volume), K represents the number of total frames (identical to that of total vertical lines), and C represents a constant. Three frames including the three vertical lines obtained by the above algorithm are used as reference frames for setting three VOIs.

Figure 5:
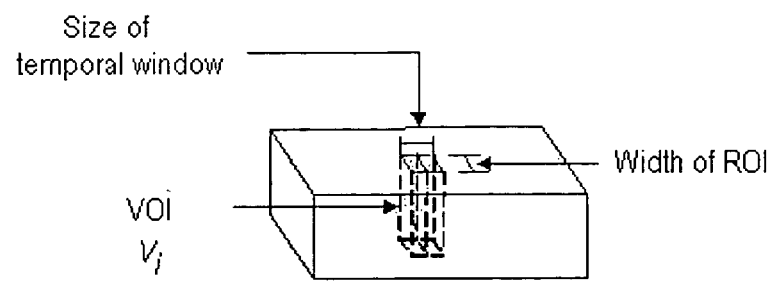
FIG. 5 is a schematic diagram showing an example of VOI set in ultrasound volume data.

The VOI setting unit 130 collects the neighboring frames by referring to each of the three reference frames and sets VOIs by using ROIs existing in the collected frames. FIG. 5 shows an example of VOI set in the volume data. In FIG. 5, the length of VOI on a time axis is determined by the reference frame and frames existing at the right and left sides of the reference frame. The width of the VOI is defined according to the width of ROI set in the ROI setting unit 120. VOI set in the VOI setting unit 130 can be expressed as the following equation:

$$V_{\hat{k}_i} = \{f_{ROI}(k), \hat{k}_i - 1 \leq k \leq \hat{k}_i + 1\} \text{ for each } \hat{k}_i \quad (3)$$

wherein, $\hat{k}_i$ represents the positions of three vertical lines having a maximum standard deviation in the horizontal cutting plane image (i.e., frame positions), $f_{ROI}(k)$ represents ROI in a $k^{th}$ frame, and $V_{\hat{k}_i}$ represents VOI formed by combining ROIs within the reference frame and neighboring frames thereof. The VOI setting unit 130 sets three VOIs for three reference frames.

Figure 6:
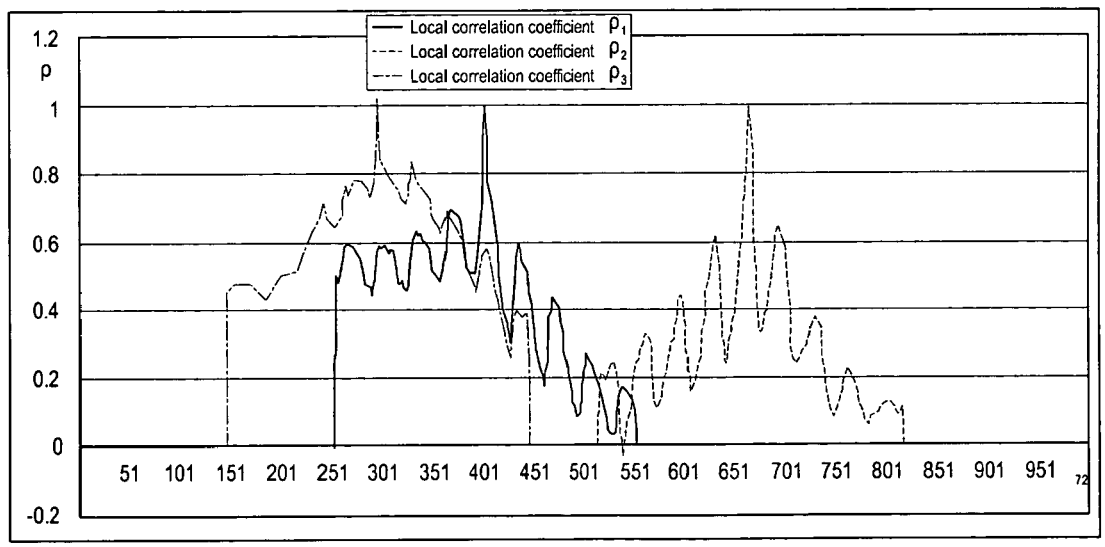
FIG. 6 is a graph showing three correlation coefficient curves.

The correlation coefficient curve calculating unit 140 calculates the correlation coefficient curves during a constant time on a time axis by using VOIs set in the VOI setting unit 130. The correlation coefficient curve is calculated through the following equation.

$$\rho_i(V_k, V_{\hat{k}_i}) = \frac{E[V_k V_{\hat{k}_i}] - E[V_k]E[V_{\hat{k}_i}]}{\sigma_{V_k} \sigma_{V_{\hat{k}_i}}}, \quad (4)$$

$$(\hat{k}_i - 200 \leq k < \hat{k}_i + 200) \text{ for each } \hat{k}_i$$

wherein, $E[V_k]$ and $E[V_{\hat{k}_i}]$ represent the average of brightness within VOIs at k and $\hat{k}_i$ positions, $\sigma_{V_k}$ and $\sigma_{V_{\hat{k}_i}}$ represent the mean of standard deviation of brightness within VOIs at k and $\hat{k}_i$ positions, and $\rho_i(V_k, V_{\hat{k}_i})$ represents a correlation coefficient between VOI at a k position and VOI at a $\hat{k}_i$ position. The correlation coefficient curve calculating unit 140 calculates the three correlation coefficient curves for three VOIs set in the VOI setting unit 130. The reason for calculating the three correlation curves is to utilize the local characteristics in volume data. FIG. 6 is a graph showing the three correlation coefficient curves obtained in the correlation coefficient curve calculating unit 140.

Figure 7:
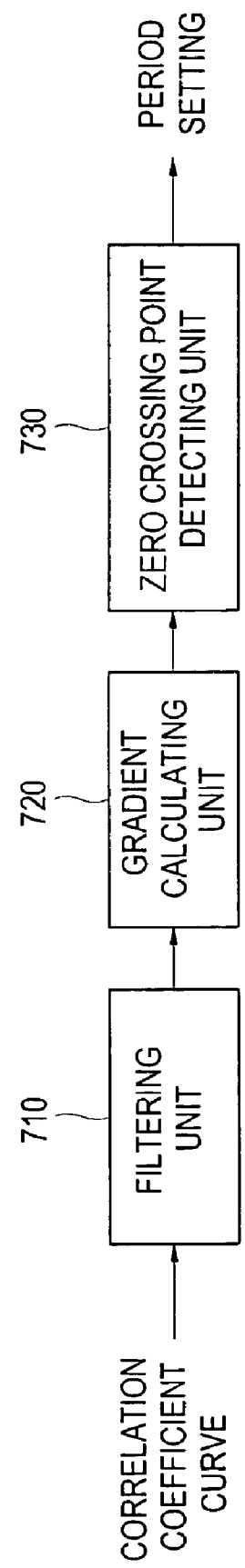
FIG. 7 is a block diagram showing a procedure of detecting a global period of heartbeat in a period setting unit.

The period setting unit 150 first detects a period by using peak points having a similar distance among peak points existing in the correlation coefficient curves obtained in the correlation curve calculating unit 140. This period will be referred to as a global period. FIG. 7 is a block diagram showing a procedure for detecting the global period in the period setting unit 150. The period setting unit 150 includes a filtering unit 710, a gradient calculating unit 720 and a zero cross point detecting unit 730. The filtering unit 710 filters the correlation coefficient curves to reduce noises included therein. A low pass filter is used in the filtering unit 710, which is constructed in accordance with the present invention. The gradient calculating unit 720 calculates the gradients in the filtered correlation coefficient curves. The zero cross point detecting unit 730 calculates zero cross points, the gradient of which is changed from positive to negative, and then detects the zero cross points having a similar distance, thereby setting a period of the detected zero cross points to the global period of the heart.

Figure 8:
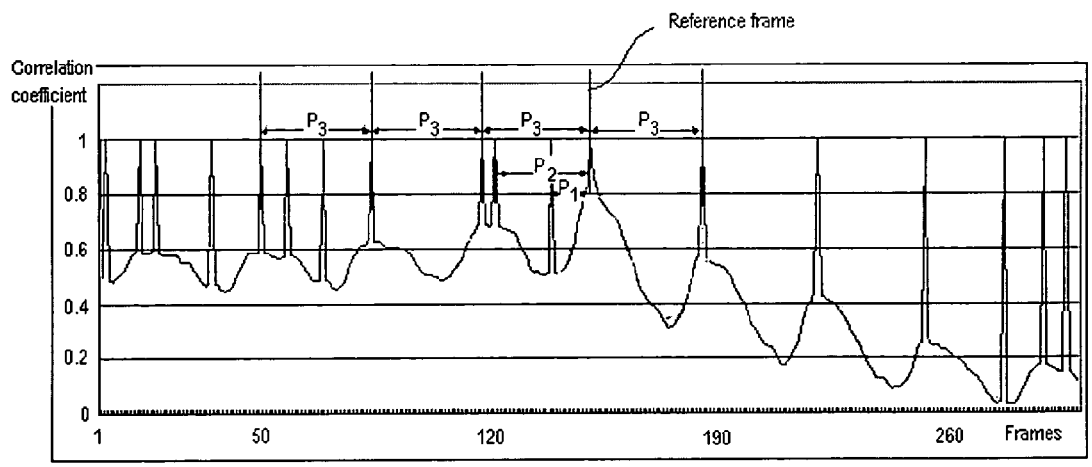
FIG. 8 is a diagram showing an example of detecting a global period of heartbeat.

The period setting unit 150 sets expected periods by using right and left peak points by referring to a central peak point of each of the three correlation coefficient curves. That is, the period setting unit 150 calculates six expected periods of the heartbeat (Pn). FIG. 8 shows an example of detecting the global period in an arbitrary correlation coefficient curve. The period setting unit 150 selects one period ($P_3$) having the highest frequency among the expected periods ($P_1$, $P_2$, $P_3$) and then sets the selected period to the global period of the heartbeat. The period selection can be expressed as the following equation.

$$p_{FHB} = \text{mode}(p_n) \quad (5)$$

wherein, $p_n$ represents six expected periods detected from three correlation coefficient curves formed from VOI, and $p_{FHB}$ represents a period having the highest frequency among the six expected periods.

Subsequently, the period setting unit 150 sets a new reference frame, which is off the reference frame as far as the global period, and then sets a search region including a predetermined number of frames adjacent to the new reference frame. The period setting unit 150 calculates the correlation coefficients between VOI in the new reference frame and each VOI in each frame included in the search region. If a correlation coefficient of an arbitrary frame is maximal among the correlation coefficients of the frames included in the search region and the correlation of the arbitrary frame is greater than a value multiplying a predetermined weight by an average of the correlation coefficients, then an interval between the arbitrary frame and the new reference frame is determined as the local period. The above process for calculating the local period is repeatedly carried out to the end of the volume data, thereby obtaining total local periods.

The ultrasound data reconstructing unit 160 performs a linear interpolation for the frames included within each local period by using the global period set in the period setting unit 150. The ultrasound data reconstructing unit 160 calculates a ratio (r) of the local period to the global period as the following equation.

$$r = \frac{\text{Local Period}}{\text{Global Period}} \quad (6)$$

Thereafter, an interpolation frame (I') is calculated as the following equation using the ratio (r) of the local period to the global period.

$$I' = \Delta_2 \times I_n + \Delta_1 \times I_{n+1} \quad (7)$$

wherein, $I_n$ and $I_{n+1}$ represent frames adjacent to the interpolation frame I', $\Delta_1$ and $\Delta_2$ represent the distances between the adjacent frame and the interpolation frame, wherein $\Delta_1$ and $\Delta_2$ are determined according to the ratio (r) of the local period to the global period. This interpolation process is carried out for frames included in all local periods.

Figure 9:
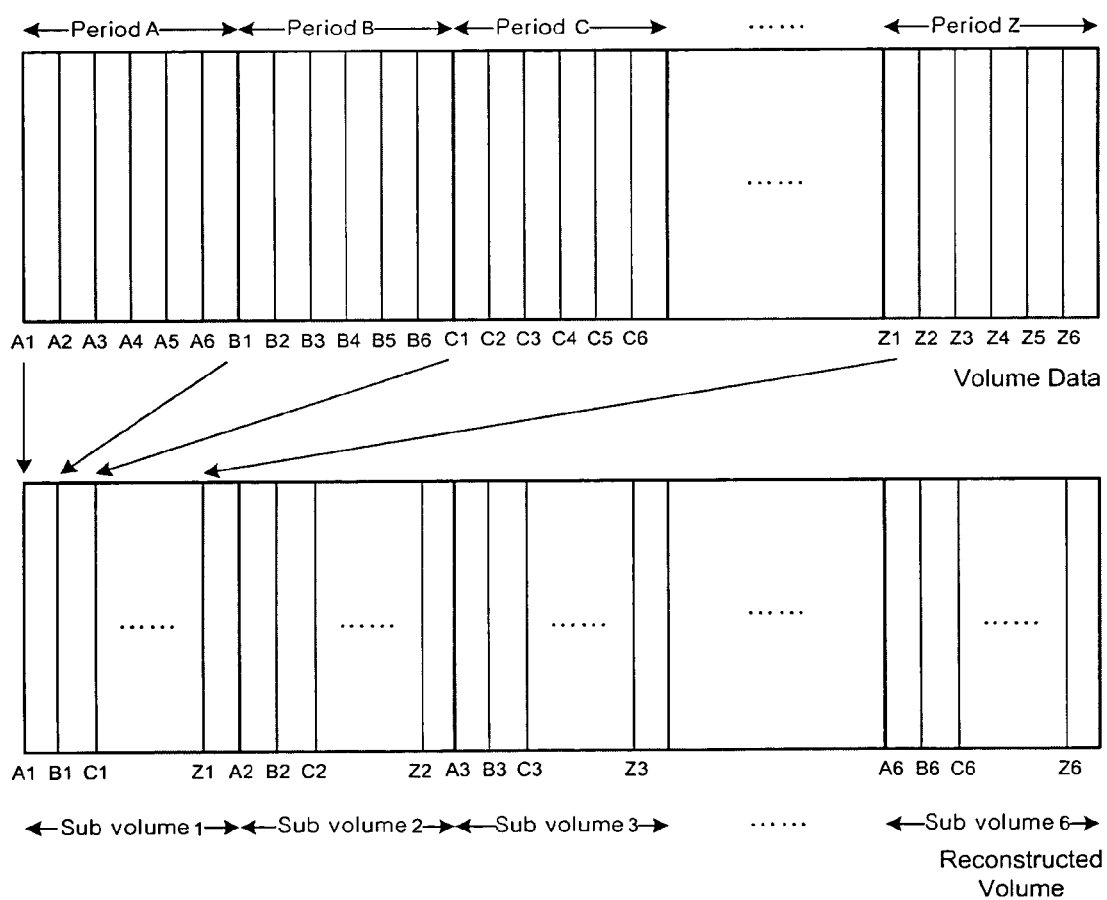
FIG. 9 is a diagram showing a procedure of reconstructing ultrasound volume data in accordance with the present invention.

After completing the interpolation, the ultrasound data reconstructing unit 160 reconstructs the interpolated volume data to provide a 3-dimensional ultrasound image showing a figure of the heartbeat in accordance with the present invention. FIG. 9 shows a procedure for reconstructing the interpolated volume data. As shown in FIG. 9, twenty-six local periods A to Z exist in one volume data. Assuming that six frames are contained in one local period in the volume data as shown in FIG. 9, the reconstructed volume data includes six sub volumes. Each of the sub volumes consists of 26 frames $A_i$ to $Z_i$.

Further, when the 3-dimensional volume data are acquired by scanning the target object, the object (e.g., expectant mother or fetus) may be moved. This makes it difficult to accurately detect the heartbeat of the fetus. Accordingly, the ultrasound image processing device further includes a motion compensating unit. The motion compensating unit compensates the motion of the expectant mother or the fetus by matching the brightness of pixels between a previously set VOI and a currently set VOI. The motion compensating unit calculates the motion vectors by summing the absolute differences of brightness of pixels between the previously set VOI and the currently set VOI. For example, assuming that VOI at a nth frame is expressed as $V^n(m)$, VOI at a next frame can be expressed as $V^n(m+1)$. In this case, a variable m represents the combination of n−1, n and n+1. The motion compensating unit moves $V^n(m)$ up, down, right and left (i, j), and then calculates the absolute differences of brightness of pixels between $V^n(m)$ and $V^n(m+1)$ at each position. A motion vector is estimated at a position where the absolute difference is minimal. The sum of the absolute difference is calculated as the following equation.

$$SAD_n(i, j) = \sum_{m=-1}^{1} \sum_{l=0}^{M-1} \sum_{k=n_T}^{n_B} |V^n(m, k, l) - V_{i,j}^n(m+1, k, l)| \quad (8)$$

$$\text{for } -W \le i, j < W, 1 \le n < K-1$$

wherein, W represents a predefined motion estimated range, K represents a total number of the frames, i, j represent motion displacements, k, l represent the position of a pixel in the frame included in VOI, and m represents the number of the frames.

Since the period of heartbeat of the fetus is locally calculated by the global period and the ultrasound volume data are reconstructed in accordance with the present invention, an improved ultrasound image of the target object having the moving object can be provided. Also, since the motion of the expectant mother or the fetus is compensated, the ultrasound image can be more accurately and clearly provided.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. An apparatus for processing an ultrasound image of a target object including a periodically moving object, comprising:
    a pre-processing unit configured to cut ultrasound volume data acquired from a target object in a predetermined direction to obtain a cutting plane image, said ultrasound volume data being constructed with frames;
    an ROI setting unit configured to perform horizontal projection upon the cutting plane image to determine boundaries of regions of interest (ROIs) and setting ROIs to each of the frames based on the boundaries of ROIs;
    a VOI setting unit configured to select a predetermined number of first reference frames from the ultrasound volume data by using standard deviation of brightness of vertical lines in the cutting plane image and set a predetermined number of volumes of interest (VOIs) by combining ROIs of the first reference frames with ROIs of frames adjacent to the reference frames;
    a motion compensating unit configured to process the VOIs to compensate a motion of the target object;
    a correlation coefficient curve calculating unit configured to calculate a correlation coefficient curve for a predetermined interval at each VOI;
    a period setting unit configured to set a moving period of the moving object based on the correlation coefficient curve in the volume data; and
    an ultrasound volume data reconstructing unit configured to reconstruct the ultrasound volume data based on the moving period.

2. The apparatus of claim 1, wherein the motion compensating unit estimates a motion vector by using absolute differences of brightness of pixels between a previous VOI and a current VOI, and wherein the motion compensating unit compensates the motion of the target object by using the estimated motion vector.

3. The apparatus of claim 2, wherein the period setting unit includes:
    a filtering unit for filtering the correlation coefficient curve to reduce noises;
    a gradient calculation unit for calculating gradients from the filtered correlation coefficient curve; and
    a zero crossing point detecting unit for detecting zero crossing points changing a sign of the gradient from positive to negative and determining a global period based on intervals between the detected zero crossing points.

4. The apparatus of claim 3, wherein period setting unit sets a second reference frame off the first reference frame as far as the global period and calculates a correlation coefficient of frames adjacent to the second reference frame, thereby setting a local period determined based on an interval between the second reference frame and a frame having a maximum correlation coefficient among the adjacent frames.

5. The apparatus of claim 4, wherein the ultrasound data reconstructing unit performs linear interpolation for the frames included within each local period by using a ratio of the local period to the global period.

6. The apparatus of claim 1, wherein the pre-processing unit further performs pre-processing to reduce noises from the ultrasound volume data before setting ROIs to the frames.

7. The apparatus of claim 6, wherein the pre-processing is soft-thresholding for the ultrasound volume data in a wavelet domain.

8. A method of processing an ultrasound image of a target object including a periodically moving object, the method being performed under the control of an ultrasound image processing device including a preprocessing unit, a ROI setting unit, a VOI setting unit, a motion compensating unit, a correlation coefficient curve calculating unit, a period setting unit and an ultrasound volume data reconstructing unit, comprising the steps of:

a) using the preprocessing unit within the ultrasound image processing device to cut ultrasound volume data acquired from a target object in a predetermined direction to obtain a cutting plane image, said ultrasound volume data being constructed with frames;

b) using the ROI setting unit within the ultrasound image processing device to perform horizontal projection upon the cutting plane image to determine boundaries of regions of interest (ROIs) and set ROIs to each of the frames based on the boundaries of ROIs;

c) using the VOI setting unit within the ultrasound image processing device to select a predetermined number of first reference frames from the ultrasound volume data by using standard deviation of brightness of vertical lines in the cutting plane image and set a predetermined number of volumes of interest (VOIs) by combining ROIs of the first reference frames with ROIs of frames adjacent to the reference frames;

d) using the motion compensating unit within the ultrasound image processing device to process the VOIs to compensate a motion of the target object;

e) using the correlation coefficient curve calculating unit within the ultrasound image processing device to calculate a correlation coefficient curve for a predetermined interval at each VOI;

f) using the period setting unit within the ultrasound image processing device to set a moving period of the moving object based on the correlation coefficient curve in the volume data; and g) using the ultrasound volume data reconstructing unit within the ultrasound image processing device to reconstruct the ultrasound volume data based on the moving period.

9. The method of claim 8, wherein the correlation coefficient curve calculating unit is further used to:

estimate a motion vector by using absolute differences of brightness of pixels between a previous VOI and a current VOI; and compensate the motion of the target object by using the estimated motion vector.

10. The method of claim 9, wherein the period setting unit is further used to:

e1) filter the correlation coefficient curve to reduce noises;

e2) calculate gradients from the filtered correlation coefficient curve;

e3) detect zero crossing points changing a sign of the gradient from positive to negative; and e4) determine a global period based on intervals between the detected zero crossing points.

11. The method of claim 10, wherein the period setting unit is further used to:

e5) set a second reference frame off the first reference frame as far as the global period;

e6) calculate a correlation coefficient of frames adjacent to the second reference frame;

e7) set a local period determined based on an interval between the second reference frame and a frame having a maximum correlation coefficient among the adjacent frames; and e8) repeat the e5) to e7) until all local periods in the volume data are set.

12. The method of claim 11, wherein the ultrasound volume data reconstructing unit is further used to perform linear interpolation for the frames included within each local period by using a ratio of the local period to the global period.

13. The method of claim 8, further comprising the step of using the preprocessing unit to perform pre-processing to reduce noises.

14. The method of claim 13, wherein the pre-processing is soft-thresholding for the ultrasound volume data in a wavelet domain.

* * * * *